Patented Nov. 3, 1942

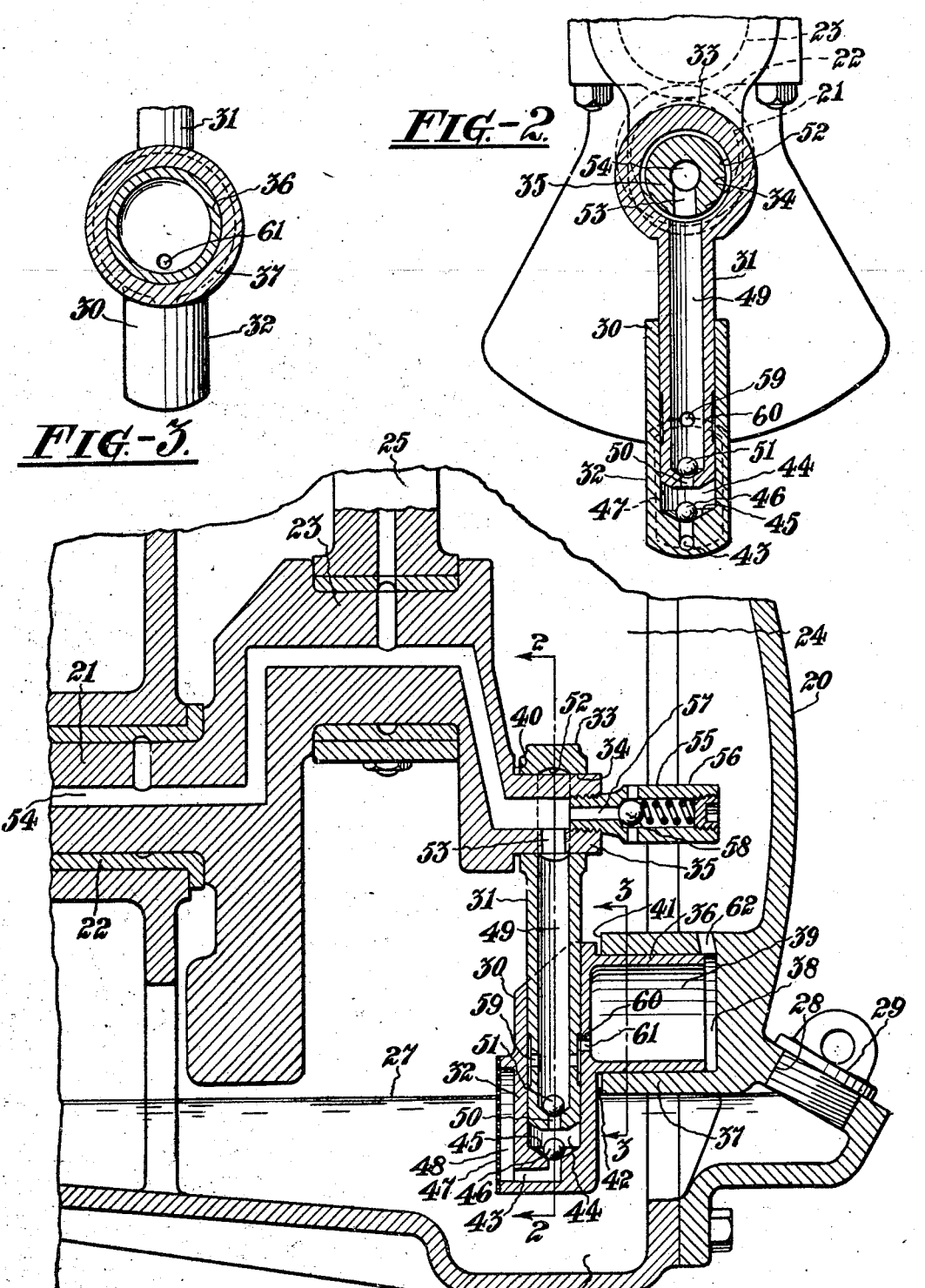

2,301,130

UNITED STATES PATENT OFFICE 2,301,130

PUMP

John Le Valley, Painted Post, N. Y., assignor to Ingersoll-Rand Company, New York, N. Y., a corporation of New Jersey Application September 3, 1941, Serial No. 409,346

2 Claims. (Cl. 184—27)

This invention relates to pumps, and more particularly to a pump of the reciprocatory piston type.

One form of service of a pump constructed in accordance with the practice of the invention may be that of pumping oil to the bearings of a rotary shaft, and when serving in that capacity the pump piston may, in addition to its normal pumping function, serve as a conduit for conveying the discharge oil from the pumping chamber.

It is an object of the invention to simplify the construction and minimize the number of parts of the pump.

Another object is to minimize the cost of constructing and assembling of the cylinder and piston members of the pump in order to assure relative coaxial alignment thereof.

Other objects will be in part obvious and in part pointed out hereinafter.

In the drawing accompanying this specification and in which similar reference numerals refer to similar parts, Figure 1 is a longitudinal elevation, partly in section, of a pump constructed in accordance with the practice of the invention and showing it applied to the crank shaft of a machine, and Figures 2 and 3 are transverse views taken through Figure 1 on the lines 2—2 and 3—3, respectively.

Referring more particularly to the drawing, 20 designates a casing which may be that of a compressor or internal combustion engine, and 21 is a crank shaft supported by a bearing 22 in the casing 20. The crank shaft has the usual crank pin 23 located in a crank chamber 24 in the casing 20 and a connecting rod 25 is shown attached to the crank pin 23.

The lower portion of the crank chamber 24 serves as a reservoir 26 for oil 27 which may be introduced into the reservoir 26 through an opening 28, in the side of the casing, normally sealed by a plug 29 threaded into the opening.

In the arrangement shown the pump, constructed in accordance with the practice of the invention and designated in its entirety by 30, comprises a reciprocatory piston 31, actuated by the crank shaft 21, and a cylinder 32 in the crank chamber to receive the piston. The piston 31 is in the form of a rigid plunger having a hub portion 33 with a bore 34 to receive a crank 35 on the end of the shaft 21.

The cylinder 32 is supported by the casing 20 and is accordingly provided with a trunnion 36 that is journaled in a bearing 37 on the wall of the crank chamber 24. The trunnion 36 and a horizontal recess 38, in the end wall of the casing 20, into which the trunnion extends are preferably of large diameter to assure ample bearing surfaces on the two and the trunnion is hollow having a recess 39 to minimize the weight of the cylinder member.

The trunnion is freely rotatable in the bearing 37 and also capable of a slight degree of endwise movement in the bearing 37 to enable the cylinder 32 to readily remain in axial alignment with the piston 31. Preferably the hub portion 33 is also free to move slightly endwise of the crank 35 to further assure concentricity of the piston 31 with the cylinder 32.

The piston 31 is, however, limited in its movement in the direction of the main body of the crank shaft 21 by a shoulder 40 on the crank shaft 21, adjacent the juncture of the crank 35 with the shaft, and movement of the piston and cylinder assembly endwise of the shaft in an opposite direction is limited by the end 41 of the bearing 37, there being normally a slight space 42 between the cylinder 32 and the bearing.

As will be readily observed, the shoulder 40 and the end 41 of the bearing 37 lie on the opposite sides of the plane of movement of the piston so that one or the other will act as an abutment to limit the movement of the pump longitudinally of the shaft 21. The clearance provided for this purpose need be of only sufficient extent to enable the piston 31 and the cylinder 32 to readily accommodate themselves to each others position. A desirable advantage of this arrangement is that no securing devices are required for retaining the hub 33 upon the crank 35 and the trunnion 36 within the bearing 37.

As a preferred arrangement, the trunnion 36 is located adjacent the upper end of the cylinder 32 and the portion of the cylinder below the trunnion is immersed in the oil in the reservoir 26 and has an inlet passage 43 that leads from the side of the cylinder 32 to the lower end of the piston chamber 44 in the cylinder. The end of the piston chamber 44 is in the form of a tapered seating surface 45 to accommodate a ball valve 46 that controls the inlet passage 43.

In order to prevent the entrance of foreign matter with the oil into the piston chamber 44 a screen 47 is attached to the side of the cylinder 32 to overlie the inlet end of the passage 43 or, as shown, an enlarged recess 48 in the side of the cylinder 32 through which the filtered oil flows to the passage 43.

In instances of use where the pump 30 serves to supply lubricant under pressure to the bearing surfaces of the shaft actuating the pump, the piston 31 also serves as a conduit for conveying the discharge oil from the piston chamber 44. Thus, in the structure shown, the piston is provided with a discharge passage 49 that communicates with the piston chamber through a port 50 controlled by a ball valve 51 seating against the lower end of the passage 49.

The upper end of the passage 49 opens into an annular groove 52 in the bore 34, and in the crank 35 is a port 53 to afford communication between the annular groove 52 and a supply passage 54 extending through the crank 35 and the shaft 21, said passage 54 having suitable branch passages for supplying oil to the various bearing surfaces of the shaft 21. Preferably a relief valve mechanism 55 is attached to the end of the crank 35 to prevent the creation of excessive pressure within the passage 54 and associated passages.

The relief valve mechanism may be of any well known type comprising a casing 56 which is threadedly connected to the crank 35 and has a relief passage 57 communicating with the passage 54 and controlled by a spring-pressed ball 58.

In the form of the invention illustrated a portion of the oil flowing through the piston 31 is diverted to effect the lubrication of the cooperating surfaces of the trunnion 36 and the bearing 37. The piston 31 is accordingly provided with ports 59 that open into an annular groove 60 in the periphery of the piston, and in the wall of the cylinder is a port 61 to afford communication between the groove 60 and the recess 39. A port 62 in the upper part of the bearing 37 adjacent the rearward end of the recess 38 vents said recess to avoid undue pressure against the trunnion tending to move it outwardly in the bearing 37.

The ports 59 and 61 may be of any suitable size but it is preferred that the annular groove 60 be shallow in order to avoid the too free escape of oil from the discharge passage 49 during a portion of the pumping stroke of the piston 31. The groove 60 is, however, of a length to afford constant communication between the ports 59 and 61 throughout the stroke of the piston 31.

The operation of the device, briefly described, is as follows: Upon rotation of the shaft 21 the piston 31 is caused to reciprocate within the cylinder 32 and, on its upward stroke, draws oil into the piston chamber through the inlet passage 43. During the following downward stroke of the piston the valve 46 seals the inlet passage 43 and the oil is forced from the piston chamber 44 through the port 50 into the discharge passage 49, the passage 54 and its branch passages. On this stroke of the piston the ball valve 51 is, of course, unseated and again returns to its seat at the beginning of the suction stroke of the piston to prevent the return flow of oil from the discharge passage 49 into the piston chamber 44.

During such operation of the piston a portion of oil passes from the discharge passage 49 into the groove 60 to lubricate the cooperating surfaces of the piston and the cylinder and oil also flows through the port 61 into the recess 38 to lubricate the cooperating surfaces of the trunnion 36 and the bearing 37.

In the event that the pressure of the oil within the passages 49—54 should rise above that which it may be intended to maintain therein the ball valve 58 will be unseated and a portion of the oil will escape through the passage 57 into the crank chamber.

I claim:

1. A pump, comprising a casing, a reservoir for oil, a rotary shaft supported by the casing, a piston member and a cylinder member cooperating with each other telescopically for pumping oil from the reservoir, an inlet passage in one member for conveying oil from the reservoir into the cylinder member, a discharge passage in the other member for conveying oil from the cylinder member, means for pivotally connecting one member to the shaft on an axis off-set with respect to the axis of rotation of the shaft, a trunnion on the other member, there being a horizontal recess in the casing to receive the trunnion, channels in the piston member and the cylinder member to afford constant communication between the cylinder member and the recess for supplying oil to the recess, and a vent in the casing opening into the upper part of the recess to permit the passage of oil from the recess.

2. A pump, comprising a casing, a reservoir for oil, a rotary shaft in the casing having a crank and a passage for oil, a cylinder in the casing having an inlet passage opening into the reservoir, a valve to control the inlet passage, a trunnion on the cylinder, there being a horizontal recess in the casing to receive the trunnion, a piston connected to the crank and reciprocable in the cylinder to force oil from the cylinder and having a discharge passage for conveying oil from the cylinder to the first-mentioned passage, channels in the piston and cylinder to afford constant communication between the cylinder and the recess for supplying oil to the recess, and a vent in the casing opening into the upper part of the recess to permit the passage of oil from the recess.

JOHN LE VALLEY.